Figure 1:
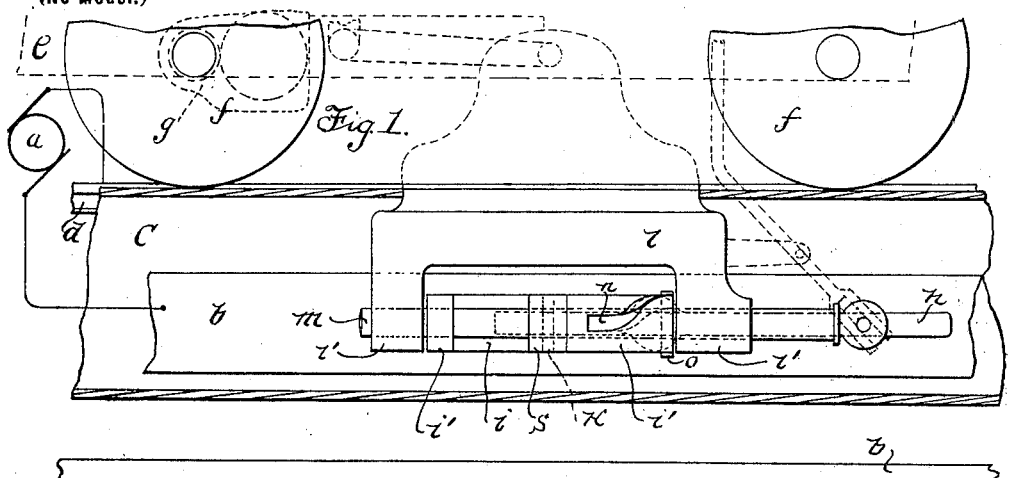

No. 676,888. Patented June 25, 1901.
E. FRISCHMUTH.
ELECTRIC RAILWAY SYSTEM.
(Application filed Feb. 12, 1900.)
(No Model.)

Witnesses:
Hubert Obryfell
Max N. Label

Inventor
Emmerich Frischmuth,
By Charles A. Brown & Bragg
Attorneys.

UNITED STATES PATENT OFFICE.

EMMERICH FRISCHMUTH, OF BERLIN, GERMANY, ASSIGNOR TO THE SIEMENS & HALSKE ELECTRIC COMPANY OF AMERICA, OF CHICAGO, ILLINOIS.

ELECTRIC-RAILWAY SYSTEM.

SPECIFICATION forming part of Letters Patent No. 676,888, dated June 25, 1901.

Application filed February 12, 1900. Serial No. 4,919. (No model.)

*To all whom it may concern:*

Be it known that I, EMMERICH FRISCHMUTH, a subject of the German Emperor, residing at Berlin, in the Empire of Germany, have invented a certain new and useful Improvement in Electric-Railway Systems, (Case No. 320,) of which the following is a full, clear, concise, and exact description, reference being had to the accompanying drawings, forming a part of this specification.

My invention relates to electric-railway systems, and more particularly to that class of electric-railway systems which employ an underground trolley-conductor for the transmission of current to the cars of the system.

My invention has for its object the provision of an improved current-collecting portion adapted for engagement with the underground trolley-conductor which is capable of insertion and removal from the conduit in which the trolley-conductor is mounted at any point in the line of travel of the car. The presence of dirt, snow, and ice upon the current-collecting portion, obstructions in the line of travel of the vehicle, and many other obvious reasons make it desirable, if not essential, that the said current-collecting portion be removable from the conduit at any desired point, and it is this object which my invention is primarily adapted to secure.

In accordance with my invention I pivotally mount the contact part which is adapted to engage the trolley-conductor in a frame and provide suitable springs for securing efficient engagement therewith. I then preferably so mount the said frame that it is capable of being revolved through an angle of substantially ninety degrees in the current-collecting apparatus about an axis parallel to the line of travel of the vehicle, whereby it is possible to readily remove the whole apparatus from the conduit when placed in its proper position. In accordance herewith I provide a preferably non-rotatable shaft for the current-collecting apparatus which is movable longitudinally thereof and upon which the above-mentioned frame carrying the contact portion is revolubly mounted in any suitable manner, preferably by means of bearings. I preferably provide a screw-threaded engagement between the bearings and a portion of this shaft, whereby a longitudinal movement of the said shaft will revolve the said frame through an angle of substantially ninety degrees. I also preferably provide a means whereby the contact portion above mentioned is brought out of engagement with the trolley-conductor before the longitudinal movement of the shaft is completed to restore the apparatus to its closed position or that position in which it is capable of being removed from the conduit. By this means I prevent the contact portion from engaging the top instead of the side of the trolley-conductor when the apparatus is being opened or being placed in its operating condition.

I secure the advantages above mentioned and others which will be apparent by means of the construction which I will now describe in connection with the accompanying drawings, illustrating the preferred embodiment of my invention, in which—

Figure 2:
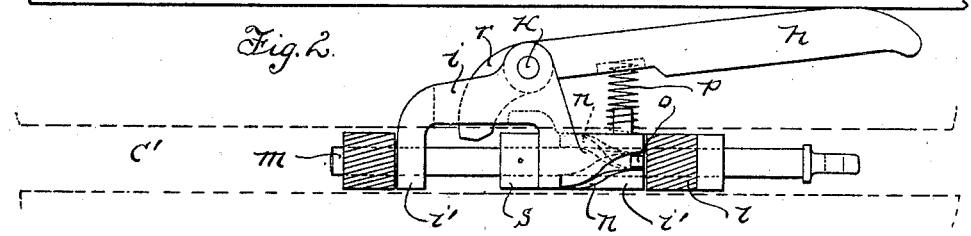
Figure 3:
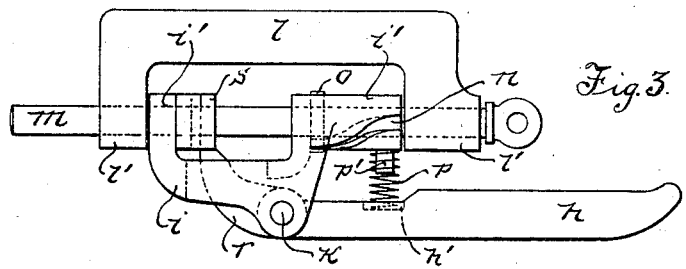
Figure 4:
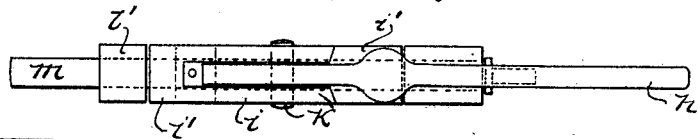
Figure 5:
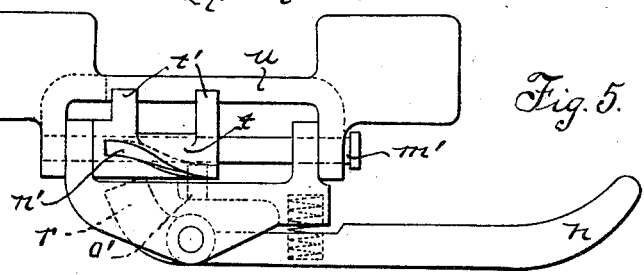

Figure 1 is a side elevation of my improved device, its attachment to the car and the circuit connections being indicated diagrammatically. Fig. 2 is a top view of the same; Figs. 3 and 4, similar views with the apparatus in its closed position ready for removal from or insertion into the conduit. Fig. 5 is an elevation of another embodiment of my invention.

Like letters of reference indicate similar parts throughout the figures.

A source of power $a$ is shown as supplying current to a trolley-conductor $b$, which is suitably mounted in a conduit $c$, the current being returned to the generator by means of the rail $d$. I have diagrammatically indicated a car-body $e$, mounted upon wheels $ff$, a motor $g$ for propelling the car receiving its current from the trolley-conductor $b$ through the agency of a contact portion $h$, which is in engagement therewith.

I preferably provide a V-shaped frame $i$, to which the contact portion $h$ is pivotally secured by means of a pin $k$. The frame $i$ is preferably provided with bearings or supporting-rings $i'$ at its extensions, by means of which it is revolubly mounted in the current-collecting frame $l$ through the agency of a shaft $m$, in engagement therewith and movable longitudinally therein. The shaft $m$ passes through bearings $l'$ $l'$, provided at the extremities of the frame $l$, the bearings preventing the said shaft from rotating, suitable means for the longitudinal movement of the said shaft being provided upon and controlled from the car-body. Suitable means for raising and lowering the whole apparatus are also provided upon the car-body.

In order to readily revolve the contact portion $h$ out of engagement with the trolley-conductor $b$, I provide upon two diagonally opposite places of the bearings $i'$ preferably screw-threaded recesses $n\,n$ of high pitch and extending for about one-quarter of a revolution about the same, these recesses being adapted for engagement with a pin $o$, rigidly secured to and passing through the shaft $m$. Opposite ends of this pin engage the diagonally opposite slots $n\,n$. I preferably provide a spring $p$ between the contact portion $h$ and the bearing $i'$, said spring engaging a recessed portion $h'$ of the said contact portion and being held in place by a pin $p'$, this spring serving normally to hold the contact portion in engagement with the trolley-conductor $b$ and away from the current-collecting frame.

I preferably provide an extension $r$ of the contact portion, which is adapted to be engaged by a collar $s$ upon the shaft $m$, said collar serving when brought into engagement therewith to act oppositely to the spring $p$, thereby bringing the contact portion out of engagement with the trolley-conductor $b$ and closer to the current-collecting frame.

The operation of the device will now be readily apparent. Assuming the current-collecting device to be in the position shown in Figs. 1 and 2—i.e., the device is open and in working condition, the contact portion $h$ engaging the trolley-conductor $b$—then the frame of the contact portion will be substantially at right angles to the plane of the device, which is vertical. The shaft $m$ occupies its extreme position to the right, the collar $s$ being out of engagement with the extension $r$ and the pin $o$ engaging the extreme right-hand portion of the recesses $n\,n$. In this position it is evident the current-collecting device cannot be removed from the conduit $c$ through the groove or slot $c'$. To perform this operation, I move the shaft $m$ longitudinally of the frame toward the left through the agency of the operating means provided upon the car-body above referred to. The shaft not being capable of a rotating motion it will revolve the frame $i$ during the longitudinal movement thereof by means of the pin $o$ engaging the screw-threaded recesses of high pitch $n\,n$, through an angle of substantially ninety degrees. Before the full revolution is completed the collar $s$ engages the extension $r$ and brings the contact portion $h$ out of engagement with the trolley-conductor and closer to the current-collecting frame. This latter operation is necessary, inasmuch as in the subsequent reopening of the device the contact portion $h$ would engage the top of the trolley-conductor instead of its side, thereby preventing the completion of the movement of the shaft $m$. In its closed position—i. e., when not in working condition—the device occupies the position shown in Figs. 3 and 4, in which position it may readily be removed from the conduit through the slot $c'$.

In Fig. 5 I have shown another embodiment of the invention, in which a sleeve $t$ is provided upon a stationary shaft $m'$, being longitudinally movable thereon, a rotatable movement thereof being prevented by two extensions $t'\,t'$, engaging a span $u$. The sleeve $t$ is provided with a screw-threaded recess $n'$ of high pitch, which engages a pin $o'$ upon the contact portion $h$. It is evident from the figure that a longitudinal movement of the sleeve $t$ will cause a rotatable movement of the contact portion $h$, the sleeve at the same time controlling the position of the said contact portion by engaging the extension $r$ provided thereon.

I have shown and described my invention herein as being applied especially to sliding contacts; but I do not wish to be limited to such application. Many changes and modifications may also be made of my invention by those skilled in the art without departing from its spirit, and I therefore do not wish to limit myself to the precise arrangement and construction herein shown and particularly described; but,

Having thus described my invention, I claim as new, and desire to secure by Letters Patent, the following:

1. The combination with a frame adapted for insertion and removal through a slot of an electrical conduit, of a swinging frame pivotally connected with said supporting-frame and adapted to revolve about an axis extending in the direction of travel of the vehicle, a contact pivotally connected with said revoluble frame, spring means tending to hold said contact in an outward position for contact with the conductor, and means for causing the retraction of said contact upon the rotation of said swinging frame, substantially as described.

2. The combination with a frame adapted for insertion in the slot of an electrical conduit, of a swinging frame pivotally connected with said supporting-frame and adapted to rotate so as to be either in substantial alinement with said supporting-frame, or to extend laterally therefrom, a contact pivotally connected with said swinging frame and adapted to swing in and out away from the supporting-frame, a spring tending to force said contact outwardly, a screw for causing a revolution of said swinging frame, an extension on said contact, and a collar for engaging the said extension and swinging the contact portion in when the frame revolves, substantially as described.

3. In an underground electric-railway system, the combination with a source of power, of conductors for the transmission of said